United States Patent
Anwar et al.

(10) Patent No.: US 10,627,242 B2
(45) Date of Patent: Apr. 21, 2020

(54) IDENTIFYING MISSING FEATURES IN DIGITAL MAPS BASED ON MOBILE TELEMETRY DATA

(71) Applicant: Mapbox, Inc., San Francisco, CA (US)

(72) Inventors: Sajjad Koonari Muhammed Anwar, Bangalore (IN); Bhargav Kowshik K R, Bangalore (IN); Aaron Lidman, San Francisco, CA (US)

(73) Assignee: Mapbox, Inc., San Francisco, CA (US)

( * ) Notice: Subject to any disclaimer, the term of this patent is extended or adjusted under 35 U.S.C. 154(b) by 206 days.

(21) Appl. No.: 15/831,245

(22) Filed: Dec. 4, 2017

(65) Prior Publication Data

US 2019/0170519 A1   Jun. 6, 2019

(51) Int. Cl.
| | |
|---|---|
| G01C 21/32 | (2006.01) |
| G06F 16/29 | (2019.01) |
| H04W 4/38 | (2018.01) |
| G01S 19/43 | (2010.01) |

(52) U.S. Cl.
CPC ............. *G01C 21/32* (2013.01); *G06F 16/29* (2019.01); *G01S 19/43* (2013.01); *H04W 4/38* (2018.02)

(58) Field of Classification Search
CPC .......... G01C 21/32; G06F 16/29; H04W 4/38; G01S 19/43
See application file for complete search history.

(56) References Cited

U.S. PATENT DOCUMENTS

2016/0357188 A1* 12/2016 Ansari ................. G05D 1/0212

* cited by examiner

*Primary Examiner* — Michael D Lang
(74) *Attorney, Agent, or Firm* — Fenwick & West LLP

(57) ABSTRACT

A method for identifying missing map features in an electronic map, involving receiving telemetry probes indicating a geographic location of a mobile computing device, and identifying a subset of telemetry probes corresponding to an existing map feature. The identified subset is then removed from an aggregation of telemetry probes, and the remaining telemetry probes used to generate a density map and identify missing clusters of telemetry probes. A geometry of the missing clusters is determined, and a missing map feature defined from the geometry of the missing cluster. An electronic map may be updated with the missing map feature.

22 Claims, 9 Drawing Sheets

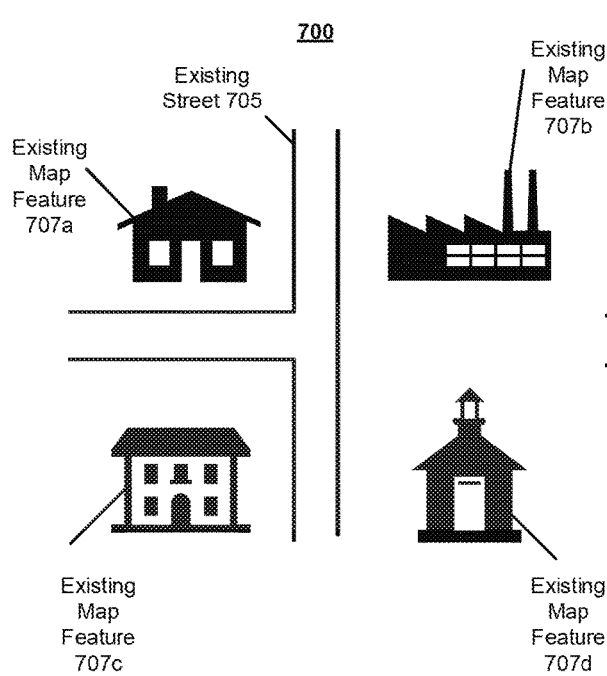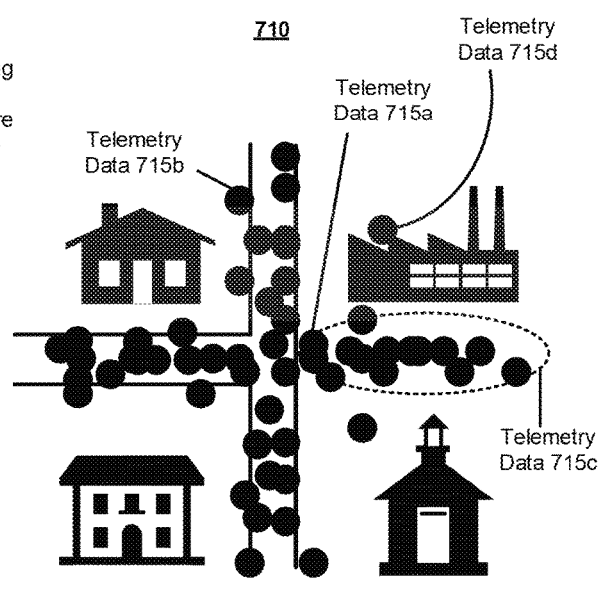
FIG. 7A
FIG. 7B

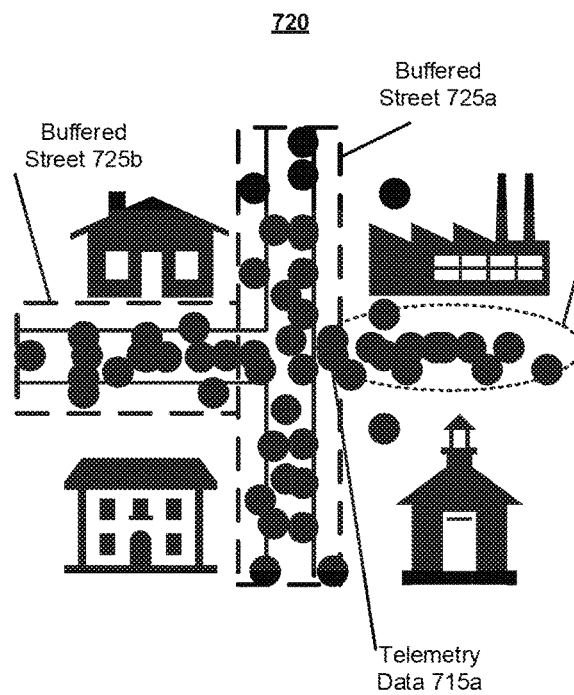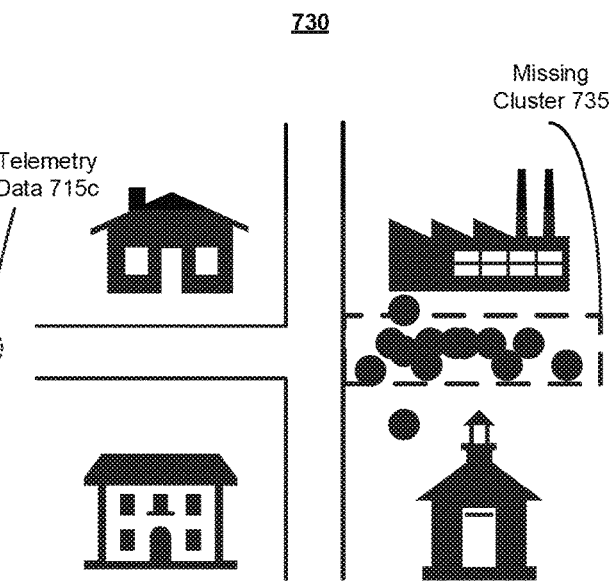
FIG. 7C
FIG. 7D

IDENTIFYING MISSING FEATURES IN DIGITAL MAPS BASED ON MOBILE TELEMETRY DATA

BACKGROUND

Digitally stored electronic maps are used to provide directions to users of mobile devices, for example, using any of a wide array of standalone map or direction application programs or apps. Today's electronic maps correctly determine where a mobile device is within a few feet or meters, or show where the user of that mobile device is on the electronic map in real time. Electronic maps also typically include other functionality, such as providing turn-by-turn directions to nearly any location. Additional elements such as traffic or wrecks may also be shown.

Electronic maps also appear in other applications aside from standalone mapping applications. For example, ride sharing applications, taxi applications, video games, and other applications may use digital maps. These or other applications obtain electronic maps by calling a map server computer through an Application Programming Interface (API). Thus, a single electronic map provider that owns or operates the server computer may supply the electronic maps for many different applications.

Electronic maps are constructed from a variety of different sources, with degrees of accuracy often depending on their intended application. For maps used to provide turn-by-turn directions on roadways, the accuracy of the roadway position within the electronic map is important to the functioning of the map, since inaccuracies will become very apparent to users as they attempt to navigate. However, collecting road position information to construct an electronic map is often a labor intensive process, and frequently achieved through manual collection of street data using a fleet of vehicles and other on-the-ground collection infrastructure. Furthermore, the ability of the electronic map to accurately project a user's real-world physical location onto a position in an electronic map is not guaranteed, since systematic errors in the Global Positioning System (GPS) collection data can lead to misalignment of sections of the map. Systematic errors in GPS collection data may arise from miscalibration of a collection vehicle's inertial measurement unit (IMU), a lack of satellite signal, signal obstruction, or multipath error. Furthermore, because roadways may change, for example, as the result of construction, the electronic map may not be accurate in an interim period before manual collection of street data is taken again. In general, conventional means of improving mapping accuracy involve updating the map with new on-the-ground data collection, requiring manual data collection to be taken and updated repeatedly. Improved ways of updating electronic maps, identifying changes to the roadway and improving the accuracy of the map are needed to provide more real-time updates without needing to manually re-take street data.

SUMMARY

Systems and methods for identifying missing map features in an electronic map are provided herein. Mobile computing devices, such as mobile phones, collect location data indicating user movements through an area corresponding to a portion of an electronic map. Mobile computing devices are useful sources of information for identifying missing features of an electronic map and updating the map in response to changes on the ground. To identify collective user behavior indicating previously unknown map features, such as new roads, the systems and methods described herein aggregate telemetry data provided by mobile computing devices. Telemetry data refers to location data provided by a mobile computing device that indicates the device's location, such as a GPS location, at a specific time. The location data may be in the form of telemetry probes, which are single location data points at a time.

The aggregated telemetry probe data received from multiple mobile computing devices are located within an existing electronic map, and telemetry probes associated with existing map features are removed. Telemetry probes associated with existing map features have locations corresponding to previously-known map features, such as roads, in the existing electronic map. The remaining telemetry probes, which are unassociated with known map features, are possible candidates for containing information regarding missing features. These remaining probes are then used to generate a density map within sections of the electronic map containing possible missing features. Telemetry probes within the density map that meet a threshold density requirement are then grouped into missing clusters. The geometry of missing clusters are then determined and identified as map features, and missing map features corresponding to missing clusters are incorporated into the existing electronic map following a check. Thus the existing electronic map is updated with missing map features based on user behavior reflected in the received telemetry probes.

In some embodiments, a method involves receiving, from each of a plurality of mobile computing devices, a plurality of telemetry probes. Each telemetry probe includes a geographic location of a mobile computing device at a time of the probe. The method includes aggregating the received pluralities of telemetry probes to obtain an aggregated set of telemetry probes. The method further involves identifying a subset of telemetry probes in the set of aggregated telemetry probes. Each telemetry probe in the subset of telemetry probes corresponds to an existing map featured pasted on the geographic location of the telemetry probe in an electronic map. The method further involves removing the identified subset of telemetry probes from the set of aggregated telemetry probes to obtain a set of remaining telemetry probes, generating a density map of the set of remaining telemetry probes, and identifying a missing cluster in the density map. The missing cluster includes a subset of the remaining telemetry probes having at least a threshold density in the density map. The method further involves determining a geometry formed by the identified missing cluster, and defining a missing map feature from the determined geometry.

BRIEF DESCRIPTION OF THE DRAWINGS

In the drawings:

FIG. 7A is a graphic representation of an existing street map, in an embodiment.

FIG. 7B is a graphic representation of telemetry data overlaid on an existing street map, in an embodiment.

FIG. 7C is a graphic representation of identifying telemetry probes corresponding to existing map features, in an embodiment.

FIG. 7D is a graphic representation of an identified missing cluster, in an embodiment.

DETAILED DESCRIPTION OF EXAMPLE EMBODIMENTS

Figure 1:
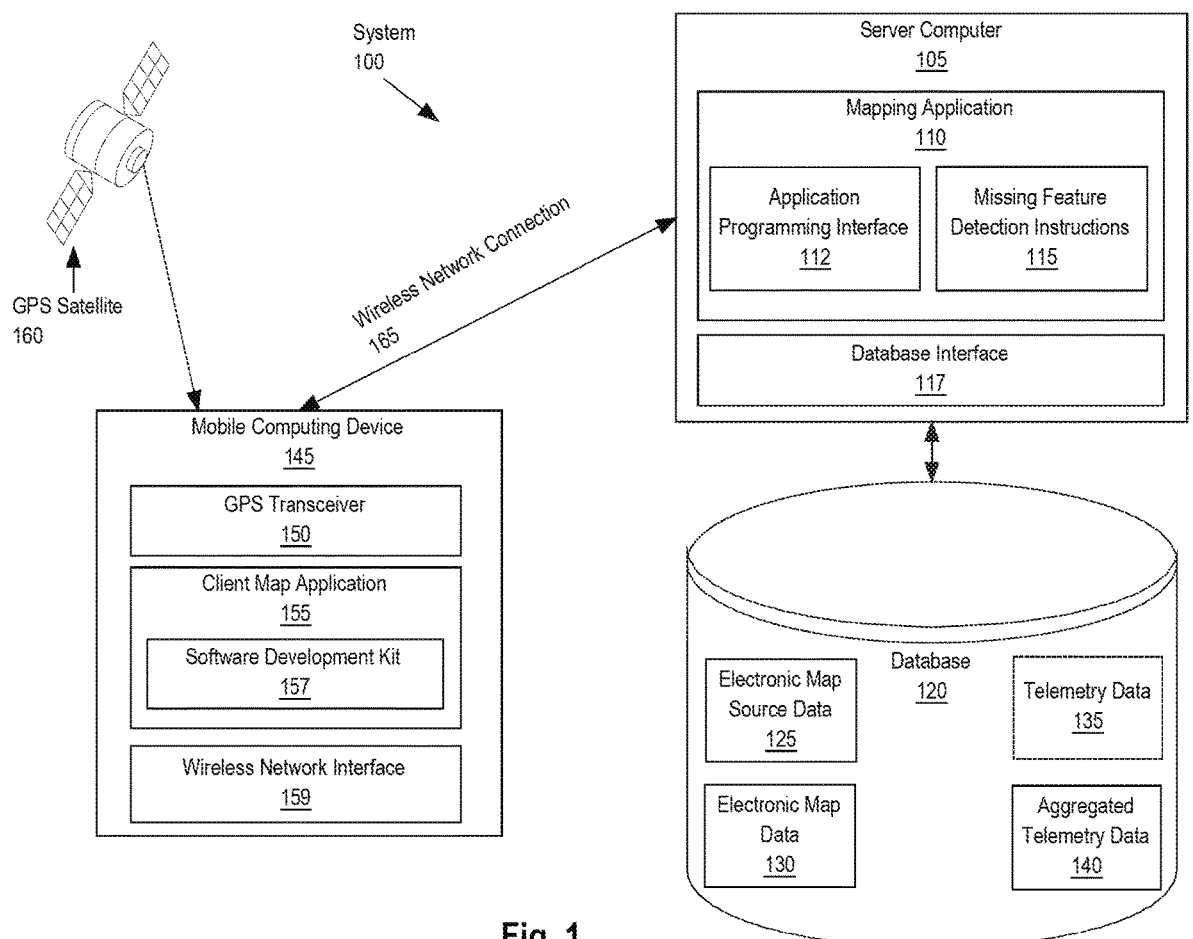
FIG. 1 illustrates an example computer system in which the techniques described may be practiced, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A mobile computing device can determine its location using GPS satellites, other positioning satellites, WiFi signals, information from other devices or networks in communication with the mobile computing device, dead reckoning, or any other method or combination of methods. The mobile computing device may augment GPS satellite location information with location information received from a network, such as a cellular network's tower locations. The mobile computing device reports its geographic location to an electronic map provider as a set of latitude and longitude coordinates, and optionally reports a height and time for each location as well. This location data and optional time data is referred to herein as telemetry data.

Telemetry data is a useful source of information for updating and maintaining electronic maps, because it provides continuous, real-world behavior of users within the map area without requiring any manual, on the ground data collection, such as vehicles dispatched specifically to collect map data. Because telemetry data can be continuously collected, telemetry data may reflect changes sooner than an electronic map. For example, users may begin driving on a new road before it is included in the electronic map. By comparing features in the telemetry data to the existing electronic map, the electronic map provider can update the electronic map to include these missing features.

An electronic map may store information about map features. Map features are any structures within the electronic map that correspond to physical structures that may affect movement of users through space. Map features may be paths through which users are able to move, such as roadways, highways, sidewalks, bridges, dirt paths, trails, parking lots, ferry routes, waterways, or any other infrastructure that facilitates user movement. Map features may also be physical structures that impede user movement, especially user movement of a user, such as buildings, roadblocks, walls, or any other infrastructure that prevents free passage of a vehicle through physical space. Map features may be detected through a variety of sources, including satellite imagery, digital street data, building or place data or terrain data. Example sources of this data include National Aeronautics and Space Administration (NASA), United States Geological Survey (USGS), and DigitalGlobe.

Using these conventional sources to identify map features, however, does not always provide comprehensive or up-to-date information. Some map features may be missing or undetectable using these conventional sources. As used herein, "missing features" refer to traversable geographic features which are not reflected as map features in an electronic map. Missing features in an electronic map may result from recent road construction, additions to on the ground infrastructure, road closures, or other sources. By collecting telemetry data, map features not otherwise visible or identifiable via satellite or the other data sources described above can be found by analyzing user travel behavior as reflected in aggregated telemetry data. Updating the electronic map with missing features improves the accuracy of the electronic map and directions or other products based on the electronic map.

Telemetry data may also help improve accuracy of the map by identifying misaligned map features. For example, due to satellite imaging errors or systematic errors in GPS collection (e.g., due to IMU miscalibration), the location of a road in an electronic map may be misaligned from its true location. By collecting telemetry data, which reflects actual user movement on the road, the discrepancy between the map's road location and the actual location can be detected and corrected.

Thus by collecting telemetry data and aggregating it to identify collective behavior of users in relation to existing map features, missing map features can be identified and updated to the electronic map. This process provides a way of improving the accuracy of an electronic map as well as providing frequent updates to the electronic map to reflect real-world changes.

FIG. 1 illustrates an example computer system in which the techniques described may be practiced. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite is coupled via a wireless connection to the mobile computing device 145. The server computer 105 comprises a mapping application 110, an application programming interface (API) 112, missing feature detection instructions 115 and a database interface 117. The database 120 comprises electronic map source data 125, electronic map data 130, telemetry data 135, and aggregated telemetry data 140. The mobile computing device 145 comprises a GPS transceiver 150, client map application 155, software development kit (SDK) 157 and wireless network interface 159. In an embodiment, map tiles are used by program libraries and SDKs, such as SDK 157, as part of displaying maps on a mobile computing device or a browser. A map application or a browser may request one or more map tiles and process the map tiles to cause display of a visual map.

Server computer 105 may be any computing device, including but not limited to: servers, racks, work stations, personal computers, general purpose computers, laptops, Internet appliances, wireless devices, wired devices, multiprocessor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of custom software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or more nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135 and aggregated telemetry data 140. These datasets may be stored as columnar data in a relational database or as flat files.

In one embodiment, electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from the electronic map source data 125. Electronic map data 130 may be updated periodically using the results of the missing feature detection instructions 115 implemented on server computer 105. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

In an embodiment, electronic map data 130 is divided into a plurality of vector map tiles at a plurality of zoom levels, wherein each map tile corresponds to a portion of a geographic map. For example, a map tile may correspond to a square area of a geographic map at a particular zoom level, or an area of a pre-defined size and location within a geographic map. In an embodiment, the portion of electronic map data within each map tile may be organized in a compact, structured format, such as the Mapbox Vector Tile Specification format, by Mapbox Inc., San Francisco, Calif. Additionally or alternatively, electronic map data 130 may comprise a plurality of map tile sets. A first set of map tiles may include electronic map data derived from a first set of electronic map source data, while a second set of map tiles may include electronic map data derived from a second set of electronic map source data.

In an embodiment, a map tile contains data describing map geometries, such as points, lines, and polygons, of features on the map. Additionally or alternatively, the map tile contains metadata, such as road names, place names, house numbers, feature types, and other properties. For example, electronic map data in a vector map tile corresponding to a portion of a geographic map may include geometry data representing roads, buildings, water, parks, and etc. to be depicted within the portion of the geographic map, as well as geometries for suggested placement of labels and other cartographic features. The map tile may also include metadata corresponding to each feature, such as names that can be rendered as labels on a digital map. Additionally or alternatively, the metadata includes data indicating the portion of the geographic map that the map tile corresponds to. For example, the metadata may include data indicating one or more coordinates of the map tile or one or more boundaries of the map tile. Additionally or alternatively, the metadata includes data indicating the zoom level at which that map tile is to be displayed. Additionally or alternatively, the metadata indicates if at least a portion of the map tile is within a body of water, such as a lake, ocean, river, etc.

In an embodiment, electronic map data is further organized into a plurality of data layers. Electronic map data may describe a plurality of map features, such as buildings, water, roads, etc. The map features may be grouped into the plurality of data layers. For example, a "Road" data layer may include map features such as streets, bridges, freeways, paths, and etc. As another example, a "Water" data layer may include map features such as rivers, lakes, oceans, canals, and etc.

In an embodiment, map tiles are rendered when requested by a client, like a web browser or a mobile application. Rendering may be performed by a rendering library of a client map application or on a server computer. Example rendering libraries include, but are not limited to, Mapbox GL JS, available from Mapbox, Inc., San Francisco, Calif., the Mapbox iOS SDK, Mapbox Android SDK, the Mapbox GL native renderer, or through a Mapbox API.

In one embodiment, telemetry data 135 is digital data that is obtained or received from mobile computing devices, such as mobile computing device 145, via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

Server computer 105 receives telemetry data from mobile computing devices, such as mobile computing device 145. The telemetry data can be in the form of telemetry probes. Telemetry probes are single indications of the location of a mobile computing device, such as the mobile computing device 145. A telemetry probe includes values indicating a location of the mobile computing device at a time at which the telemetry probe is collected. A telemetry probe may include values for longitude, latitude, elevation, the time at which the probe is collected, and/or any other form of geospatial data. In some examples, a telemetry probe is unassociated with an electronic map, such that the telemetry probe as received by the server computer 105 from the mobile computing device 145 does not yet have a designated location within the electronic map data 130. In these examples, the location data of the telemetry probe is in the form of raw GPS data. The received telemetry probes may be stored in the database 120 as telemetry data 135 or aggregated telemetry data 140. Many telemetry probes may be received by server computer 105 from a single mobile computing device 145, as well as many telemetry probes from many different mobile computing devices (not shown).

In one embodiment, aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Various applications or functions may further process aggregated telemetry data 140 as needed.

In one embodiment, mobile computing device 145 is any mobile computing device capable of providing geospatial data to server computer 105, such as a laptop computer, hand-held computer, wearable computer, cellular or mobile phone, portable digital assistant (PDAs, or tablet computer). In some embodiments, mobile computing device 145 is an onboard navigation device or other GPS-enabled device. Although a single mobile computing device is depicted in FIG. 1, any number of mobile computing devices may be present and provide location data to server computer 105. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150. GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 159 which is used by the mobile computing device to communicate wirelessly with other devices. In particular, wireless network interface 159 is used to establish wireless network connection 165 to server computer 105. Wireless network interface 159 may use WiFi, WiMAX, Bluetooth, ZigBee, cellular standards or other networks.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device.

In server computer 105, the mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, receiving electronic map source data 125 from data providers, processing electronic map source data 125 to generate electronic map data 130, and any other aspects of embodiments described herein.

Mapping application 110 includes missing feature detection instructions 115 which are programmed or configured to determine missing map features using electronic map data 130, telemetry data 135, aggregated telemetry data 140 and/or any other data in database 120 or received from mobile computing device 145.

According to one embodiment, the techniques described herein are implemented by one or more special-purpose computing devices. For example, the server computer 105 and mobile computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
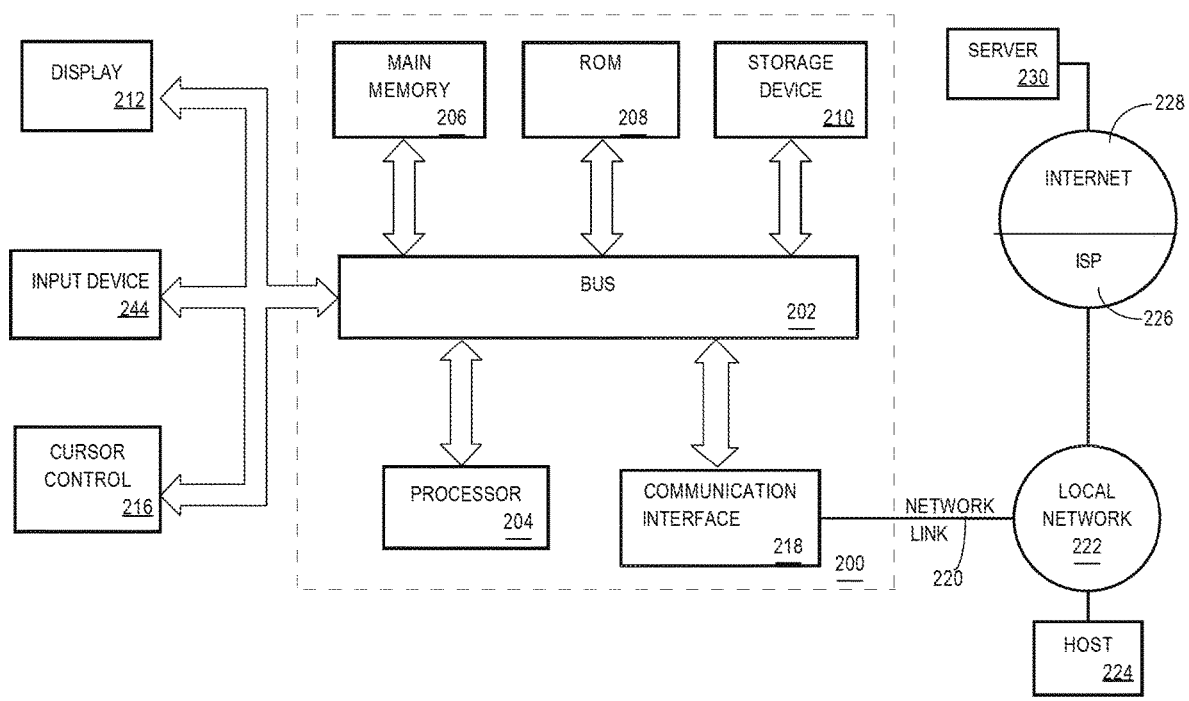
FIG. 2 illustrates a computer system upon which an embodiment may be implemented.

FIG. 2 illustrates a computer system upon which an embodiment may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a LCD screen, LED screen, or touch screen, for displaying information to a computer user. An input device 214, which may include alphanumeric and other keys, buttons, a mouse, a touchscreen, or other input elements is coupled to bus 202 for communicating information and command selections to processor 204. In some embodiments, the computer system 200 may also include a cursor control 216, such as a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received, and stored in storage device 210, or other non-volatile storage for later execution.

In one embodiment, the missing feature detection instructions 115 include instructions for identifying missing map features from telemetry data 135, aggregated telemetry data 140, and/or any other data stored in database 120 or provided to server computer 105 from mobile computing device 145. Missing feature detection instructions 115 may include any of the instructions described in processes shown in FIG. 3-6 and described in further detail below.

Figure 3:
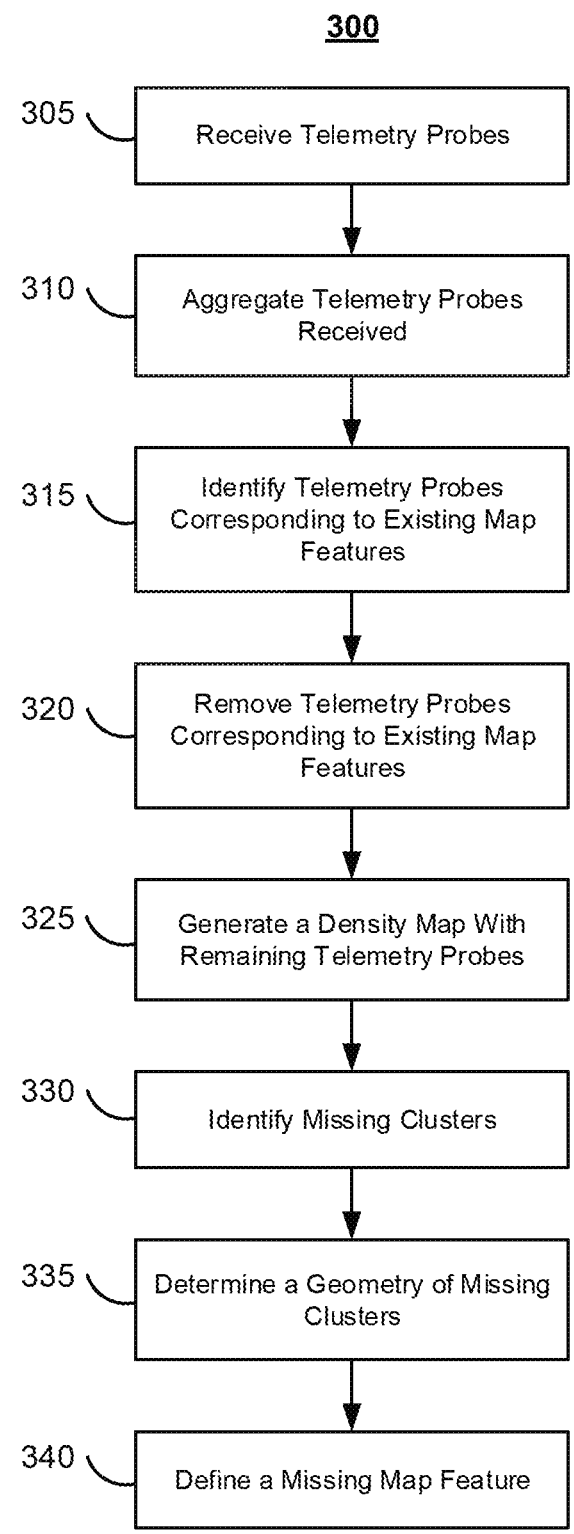
FIG. 3 shows a process for defining a missing map feature from received telemetry probes, in an embodiment.

FIG. 3 shows a process for defining a missing map feature from received telemetry probes. In various embodiments, the operations described in process 300 and shown in FIG. 3-6 may be implemented in programming by a server computer 105 or its components as described in further detail with reference to FIG. 1. For example, the operations of process 300 may be performed by the mapping application 110 according to missing feature detection instructions 115 as described with reference to FIG. 3-8. In some examples, the server computer 105 executes a set of instructions or sequence of instructions (i.e. the missing feature detection instructions 115) to control the functional elements of server computer 105 in order to perform the functions described below.

Additionally or alternatively, server computer 105 may perform aspects of the functions described below using special-purpose hardware. In some embodiments, the missing feature detection instructions 115 may instruct the server computer 105 to interact with the database 120 through database interface 117 to perform the functions described below. In some embodiments, a mobile computing device 145 performs one or more functions described below.

At 305, the server computer 105 executing the mapping application 110 with missing feature detection instructions 115 receives telemetry probes over a wireless network connection 165. Each telemetry probe includes a location of a mobile computing device, such as the mobile computing device 145 at the time the probe data is collected. The location of the mobile computing device 145 included in the telemetry probe may be determined by the mobile computing device 145 based on signals received from the GPS satellites 160 through the GPS transceiver 150. In some examples, the location of the mobile computing device 145 may be determined through communication of the mobile computing device 145 with the wireless network connection 165, such as a WiFi network, a LAN, a WAN, one or more internetworks such as the public Internet, a cellular network, or a company network. The location of the mobile computing device 145 included in the telemetry probe may include values for latitude, longitude, time, elevation, or any other geospatial data.

While system 100 shows a mobile computing device 145 in communication with server computer 105, there may be more than one mobile computing device 145 in communication with server computer 105. The telemetry probes received at 305 may come from a single mobile computing device 145 or multiple mobile computing devices. Telemetry probes received at 305 may be added to the database 120 upon receipt, or the received telemetry probes may have been previously stored in and retrieved from the database 120.

The telemetry probes received at 305 may be telemetry probes collected by the mobile computing device 145 over a time interval. For example, the telemetry probes received at 305 may be collected by the mobile computing device 145 from 12:00-1:00 pm, and therefore reflect the location of the mobile computing device 145 over the course of that hour. In other examples, the time interval over which telemetry probes are received at 305 may be a day, a week, a month, or any other length of time. Server computer 105 may continue to receive telemetry probes at 305 over a time interval, after which it proceeds to 310. Server computer 105 may continue to receive telemetry probes over a time interval at 305 until it reaches a threshold number of telemetry probes, at which point it proceeds to 310. The threshold number of telemetry probes may be a threshold number across a plurality of map tiles, and/or may correspond to a minimum density of telemetry probes within a plurality of map tiles.

Before the time interval over which telemetry probes are received at 305 expires, or before a threshold number of telemetry probes are received, telemetry probes received at 305 may be temporarily stored in database 120 as telemetry data 135. Telemetry probes received at 305 over a time interval may be grouped together and stored as a subset of telemetry data 135 before being used at 310. For example, if the server computer 105 receives telemetry probes at 305 from 12:00 am-12:00 pm over the course of a day, the telemetry probes collected starting at 12:00 am can be temporarily grouped together and stored as telemetry data 135 or a subset of telemetry data 135 before being used together at 310. Telemetry probes collected at 305 and temporarily grouped together before being aggregated at 310 may represent locations spanning a plurality of map tiles of the electronic map.

At 310, the server computer 105 executing the mapping application 110 with missing feature detection instructions 115 aggregates telemetry probes received at 305. Aggregating telemetry probes received at 305 includes determining, from the location data included in the probe, the portion of the existing electronic map each telemetry probe is located in. For example, the server computer 105 may identify the location associated with a telemetry probe received at 305. Then, accessing the database 120 through database interface 117, the server computer 105 accesses electronic map data 130 and identifies the map tile and location within the electronic map that corresponds to the location of the telemetry probe.

All of the received telemetry probes from 305 are assigned and aggregated according to their respective map tiles at 310. The telemetry probes received at 305 may be grouped together in other ways as well. For example, all telemetry probes received at 305 may be identified by the time interval over which they were collected, and continue to be identified with this time interval during aggregation at 310. The process of aggregating telemetry probes is described in further detail with reference to FIG. 4.

At 315, the server computer 105 executing the mapping application 110 with missing feature detection instructions 115 identifies telemetry probes corresponding to existing map features. Identifying telemetry probes corresponding to existing map features may be carried out for each map tile individually. In some embodiments, identifying telemetry probes may be carried out separately for sets of telemetry probes located within each map tile, or may be carried out using all of the aggregated telemetry probes for a given map tile. For example, the aggregated telemetry probes for a particular map tile can be divided into subgroups based on their relation to existing map features of the existing electronic map tile, based on a time period or group of time periods at which telemetry probes were collected, or other types of groupings.

Locations of existing map features are stored in the electronic map data 130. Existing map features are features that have already been identified and included in the electronic map prior to 305. Examples of map features are shown and described in further detail with reference to FIG. 7A-7E and FIG. 8A-8C. The existing map features may be represented by points, lines, polygons, or any N-dimensional space within the electronic map. Thus, each existing map feature occupies an N-dimensional surface which corresponds to the footprint within the electronic map of the physical object represented by the map feature. Each map feature includes a boundary representing the perimeter of the map feature around the surface area, point or line that it occupies. For example, a building occupies a 2-dimensional polygon within the electronic map which corresponds to the building footprint. The building footprint has a perimeter, which corresponds to the boundary of the building's map feature. In another example, a path may occupy a line within the electronic map. In this example, the "boundary" of the map feature is the same as the line within the electronic map. Similarly, a map feature represented by a point in the electronic map will have a "boundary" that is the point itself.

To determine if the telemetry data collected at 305 corresponds to existing map features, the server computer 105 compares the location of the telemetry probes within the electronic map as determined at 310 with the locations and areas occupied by existing map features. In some examples, a buffer region is formed around existing map features. The buffer region is formed by adding a distance to the perimeter of the existing map feature, forming a surface area that extends beyond the footprint occupied by the existing map feature. The distance added to the perimeter may be dependent on the type of existing map feature. For example, the distance added to the perimeter of the existing map feature may be proportional to the size of the existing map feature. In an example, if the existing map feature is a six-lane highway, its buffer region will be larger than a single residential street. In an example, if the existing map feature is an 8-lane highway with four lanes in each direction, then the perimeter added to the boundary of the highway may be between 25 and 30 meters. The size of the buffer may also be dependent on the characteristic infrastructure in a particular geography. For example, a buffer for a highway in the United States may be different from a buffer for a highway in Denmark. In other examples, the buffer size may be dependent on the number of telemetry probes and/or the density of telemetry probes within a map tile. For example, in map tiles with large numbers of telemetry probes, the buffer may be smaller to reflect the higher degree of accuracy of the location data within the map tile.

If a telemetry probe is located within a region occupied by an existing map feature, then the server computer 105 determines that the telemetry probe is associated with the existing map feature. For example, if a road already exists within the electronic map, the road may occupy a rectangular area within the electronic map. If a telemetry probe collected at 305 contains location data indicating that the telemetry probe location is within the existing road, then the telemetry probe 305 is associated with the existing map feature of the road. If the road includes a buffer region, and the telemetry probe is located within the buffer region of the road but exterior to the road perimeter, then the telemetry probe will also be understood to be associated with the road. Thus the comparison of each telemetry probes with existing map features entails comparing their respective locations and determining if a probe is within an area occupied by an existing map feature.

The location of all telemetry probes aggregated at 310 are compared at 315 to all existing map features to determine if each telemetry probe is associated with an existing map feature. As a result, the telemetry probes are bifurcated into subgroups, where one subgroup of telemetry probes are not associated with any existing map features, and the second subgroup of telemetry probes are located within existing map features.

At 320, the server computer 105 executing the mapping application 110 with missing feature detection instructions 115 removes telemetry probes corresponding to existing map features, as identified at 315. The removed telemetry probes may be stored at database 120 as telemetry data 135 or aggregated telemetry data 140. Removing telemetry probes corresponding to existing map features is carried out within each map tile for each map tile in the electronic map.

At 325, the server computer 105 executing the mapping application 110 with missing feature detection instructions 115 generates a density map with remaining telemetry probes. Generating a density map with remaining telemetry probes can be carried out over any number of map tiles containing remaining telemetry probes. In some embodiments, the generated density map with remaining telemetry probes spans across multiple map tiles. The remaining telemetry probes are all of the telemetry probes received at 305 that were not removed at 320. The remaining telemetry probes represent telemetry probes that are candidates for indicating missing map features, since they show user movements that are not associated with existing map features, such as existing roads, highways, paths, etc. For example, the remaining telemetry probes may correspond to a road being traveled by users that is not present in the existing electronic map.

In some embodiments, to generate the density map, the server computer 105 aggregates the remaining telemetry probes with additional telemetry probes that had previously been collected. The server computer 105 forms a density map with all map tiles containing telemetry probes that were not associated with existing map features. The resulting density map of aggregated telemetry probes gives the density of candidate missing feature probes across the one or more map tiles. In some examples, the density map may be formed from all map tiles containing telemetry probes not associated with existing map features for a section of the electronic map. For example, the density map may be generated for the map tiles of a city, group of cities, or country in the electronic map. In other examples, the density map may be generated for all map tiles of the electronic map. This process of generating a density map is described in further detail with reference to FIG. 5, and is shown in a graphic representation with reference to FIG. 7D.

At 330, the server computer 105 executing the mapping application 110 with missing feature detection instructions 115 identifies missing clusters. Missing clusters are groupings of remaining telemetry probes in the density map that are not associated with existing map features and indicate potential missing map features. Identifying missing clusters may be carried out across any number of map tiles in the density map of 325. The high density of telemetry probes in missing clusters represents high volume movement of users through the corresponding region of the electronic map. For example, a missing cluster may be a high density rectangular region of user movement within the electronic map indicating a road not present within the existing electronic map. Other telemetry probes within the density map may not be part of missing clusters or the result of a missing map feature, and may instead be telemetry probes that result from inaccurate GPS data and general noise in the position locations provided by mobile computing devices such as mobile computing device 145 to the server computer 105. By setting a threshold density for identifying a set of telemetry probes as a missing cluster, the server computer 105 can distinguish between probes resulting from noise, and probes indicating missing map features.

Using the density map generated at 325, the server computer 105 may select a threshold density for candidate missing clusters. The threshold density is used to filter out telemetry probes in the density map that are the result of inaccurate GPS calculations, aberrant user behavior, and noise in the location data of the remaining telemetry probes. The clusters of telemetry probes that have telemetry probe density above the threshold value are identified as missing clusters. The telemetry probes within the density map that are not part of the identified missing clusters as determined at 330 are removed from process 300, but may be stored in database 120 with telemetry data 135 or aggregated telemetry data 140 following their removal at 330. The process of identifying missing clusters is described in further detail with reference to FIG. 6, and is shown in graphic representation with reference to FIG. 7D.

At 335, the server computer 105 executing the mapping application 110 with missing feature detection instructions 115 determines a geometry of the identified missing clusters. Determining a geometry of the identified missing clusters may be carried out across any number of map tiles that include missing clusters, as determined at 325. A geometry of the missing clusters may be calculated based on a best fit algorithm, where the perimeter of the missing cluster is identified and a best-fit shape calculated based on the perimeter. The perimeter may be generated by first connecting telemetry probes into straight lines. Connected telemetry probes may be within a threshold distance of each other. In some examples, the clusters form a polygon. Alternatively, the missing clusters form rectangles. Each missing cluster, after its geometry is defined at 335, will have an assigned perimeter and footprint area within the electronic map, corresponding to its perimeter and the area it occupies on the ground. The assigned geometry of a missing cluster may be manually checked before it is incorporated into the existing electronic map. This process is shown in graphic representation with reference to FIGS. 7D and 7E.

At 340, the server computer 105 executing the mapping application 110 with missing feature detection instructions 115 defines a missing map feature. Following the determination of a geometry of a missing cluster at 335, the missing map feature will be defined and incorporated into the existing electronic map following a check. For example, at 340 the candidate missing cluster at 335 may be reviewed by a separate checking algorithm or manually reviewed to determine if the candidate missing cluster does in fact correspond to a missing map feature. This check may include referencing electronic map source data 125, such as satellite imagery. For example, satellite imagery may indicate road construction in the area where a candidate missing cluster is found at 335, indicating that the candidate missing cluster reflects a new road that was built since the date that the satellite image from electronic map source data 125 was collected. In other examples, the checking algorithm may determine if the candidate missing map feature matches the type of existing map features in an area surrounding the candidate missing map feature. For example, the checking algorithm may check if the candidate missing map feature in an area with residential roads is also a residential road, and flag a highway candidate missing map feature being proposed in an area with no nearby, connected highways. The manual review of candidate missing clusters may include requesting on-the-ground review from a person in the physical vicinity.

In some examples, the check prior to full incorporation of the missing cluster includes a check to determine if the missing cluster is an entirely new map feature, or is a re-aligned existing map feature. This check may include a manual check, or may include establishing a threshold distance between a new map feature and an existing map feature that indicates the missing cluster of 335 is in fact a re-aligned existing feature. For example, the identified missing cluster of 335 may be an existing road within the electronic map that is in fact at a different position within the electronic map than previously indicated and stored in electronic map data 130. This discrepancy may result from the different sources used to generate map features. For example, a missing cluster is identified from telemetry data representing actual user movement, whereas the existing map feature may have been generated based on satellite imagery, which incorrectly placed the map feature within the electronic map due to positioning errors. Misaligned map features and the check prior to incorporation of missing clusters is shown in graphic representation and described in further detail with reference to FIG. 8A-8C.

The check prior to full incorporation of the missing cluster may also include determining if the identified missing cluster is associated with a waterway, and thus represents movement of users and mobile computing devices over water. For example, the missing cluster may indicate a ferry route traveled by users, resulting in a missing cluster and missing map feature being identified across a body of water. The check for this includes determining if a portion of the identified missing map feature is located within a water map tile. Metadata associated with the map tile will indicate if the map tile is associated with a body of water. If the identified missing cluster is in fact a waterway, then the missing cluster is incorporated as a water route, rather than an object within the electronic map such as a road or highway.

Following the check, the missing clusters may be fully incorporated into the existing electronic map, and added to the electronic map data 130 of database 120. If the missing cluster is identified as a re-aligned feature of an existing map feature, the electronic map is updated by incorporating the re-aligned map feature, and removing the previous misaligned map feature. This is shown in graphic representation and described in further detail with reference to FIG. 8C.

Figure 4:
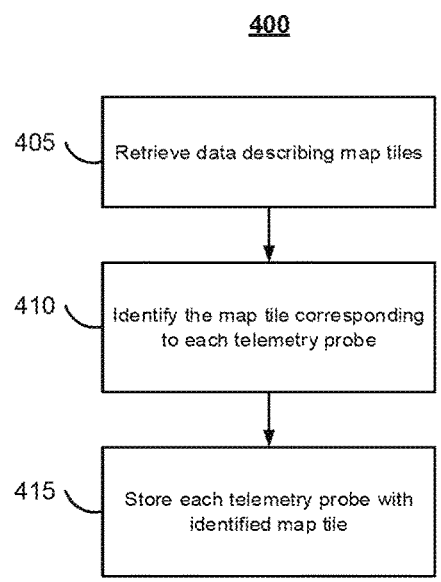
FIG. 4 shows a process for aggregating telemetry probes received, in an embodiment.

FIG. 4 shows an exemplary process 400 for aggregating received telemetry probes. Process 400 may be an embodiment of step 310 of process 300, described in further detail with reference to FIG. 3. First, at 405, the server computer 105 executing the mapping application 110 with missing feature detection instructions 115 retrieves data describing map tiles. Data describing map tiles is stored with the existing electronic map in database 120 in electronic map data 130. Process 400 is carried out across any number of map tiles corresponding to the locations of the telemetry probes received at 305.

As described with reference to FIG. 1, electronic map data 130 is divided into a plurality of vector map tiles at a plurality of zoom levels. The zoom level of tiles retrieved from electronic map data 130 may be the same zoom level used throughout process 300. At each zoom level, the map tile encompasses a set geographic area within a corresponding area of the electronic map. The zoom level used throughout process 300 may be adjusted depending on the density of infrastructure in a geographic area. For example, if a geographic area has high density infrastructure, it may have a higher zoom level to provide sufficient granularity of map features.

At 410, the server computer 105 executing the mapping application 110 with missing feature detection instructions 115 identifies the map tile corresponding to each telemetry probe received at 305. Thus the location data within each telemetry probe is used to give each telemetry probe a corresponding location within the existing electronic map, and specifically within a map tile of the existing electronic map. Identifying the map tile corresponding to each telemetry probe may include searching a spatial data structure made up of the map tiles, such as an optimized R-tree, B-tree, quadtree, grid structure, k-d tree, range tree, a priority-search tree, or any other data structure that can be used to index multidimensional data such as geographic coordinates. For example, in an R-tree search, the location of the telemetry probe may be determined through a range search through the R-tree of map tiles. The spatial data structure of map tiles may be further optimized for bulk-loading telemetry probe data. Map tile information is stored as part of the electronic map data 130.

At 415, the server computer 105 executing the mapping application 110 with missing feature detection instructions 115 stores each telemetry probe within their identified map tiles. For example, a number of telemetry probes at different locations received at 305 that all are located within the same map tile will be stored together along with an identification of the corresponding map tile as aggregated telemetry data 140. Following step 415, all telemetry probes collected at 305 are located within map tiles of the existing electronic map and stored as aggregated telemetry data 140.

Figure 5:
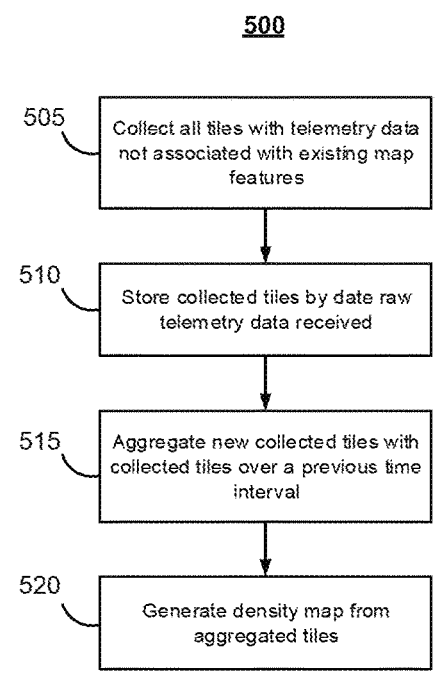
FIG. 5 shows a process for generating a density map with remaining telemetry probes, in an embodiment.

FIG. 5 shows a process for generating a density map with remaining telemetry probes. Process 500 may be an embodiment of step 325 of process 300, described in further detail with reference to FIG. 3. In some embodiments, a density map for a particular map tile is generated by aggregating multiple sets of telemetry probes associated with the same map tile of the electronic map. For example, if a set of telemetry data taken over a particular time period (e.g., 1 day) does not include sufficient data to determine whether the tile includes missing map features, telemetry data for the same map tile over multiple days may be aggregated together to generate a density map. The process 500 describes this embodiment. Process 500 may be carried out across any number of map tiles with telemetry data not associated with existing map features.

In process 300, each telemetry probe was assigned a corresponding map tile within the electronic map at 310, and was stored within the map tile, as described above with reference to FIG. 3 and FIG. 4. At 505, the server computer 105 executing the mapping application 110 with missing feature detection instructions 115 collects all tiles with telemetry data that is not associated with existing map features. Each tile may be assigned a count, which indicates the number of telemetry probes not associated with existing map features located within the tile; this count may be stored with the tile. The server computer 105 may collect any map tile with a non-zero count at 505. In some examples, the tiles collected at 505 may need to have a count above a non-zero threshold value.

At 510, the server computer 105 executing the mapping application 110 with missing feature detection instructions 115 stores the collected tiles by the date the raw telemetry data was received, such as an hour, a day, a week, a month, or any other unit of time. A set of map tiles with candidate missing feature telemetry probe data are stored and linked together by the shared time interval over which the telemetry data was collected. These map tiles may be stored together in database 120 as telemetry data 135, and/or aggregated telemetry data 140.

At 515, the server computer 105 executing the mapping application 110 with missing feature detection instructions 115 aggregates new collected tiles with collected tiles over a previous time interval. In particular, new telemetry probe data stored at 510 is added to telemetry probe data collected during previous collection cycles, e.g., over previous iterations of steps 505 and 510. The tiles aggregated at 515 may include tiles collected over a particular time interval. For example, the tiles used to form the aggregated tiles may be tiles collected over a 30 day window prior to the most recently collected tiles. In some embodiments, the time interval over which previously collected tiles are aggregated may be adjusted to ensure that the aggregated tiles have at least a minimum number of telemetry probes per map tile.

In some examples, the map tiles collected over the previous time interval are stored together and identified by the time interval they collectively span. For example, the aggregated tiles over a previous time interval may span the previous 30 days. Following step 515, the aggregated tiles over the previous time interval are updated to include newly collected map tiles.

Aggregating new collected tiles with collected tiles over a previous time interval includes aggregating the telemetry probes within each map tile of the aggregated collected tiles by adding the counts of the aggregated map tiles. For example, if a new map tile contains 5 telemetry probes, and the aggregated tiles over the previous time interval have a total of 300 telemetry probes in that same map tile, then the resulting aggregated map tile will have a count of 305 telemetry probes. The aggregated collected tiles will all have non-zero counts, or counts above a non-zero threshold, meaning that every telemetry tile in the aggregated collected tiles contains at least one or at least above a non-zero threshold number of telemetry probes that are not associated with existing map features.

At 520, the server 105 executing the mapping application 110 with missing feature detection instructions 115 generates a density map from the aggregated tiles. The density map may measure telemetry probe density across a single map tile, multiple map tiles, as well as regions within the map tile itself. For example, the density map may determine both that a tile has a density of 3 probes/meter across the entire map tile, as well as a region within the same tile that has a density of 10 probes/meter. The density map generated at 520 is then used at 330 to identify missing clusters, as discussed in further detail with reference to FIG. 3 and FIG. 6.

Figure 6:
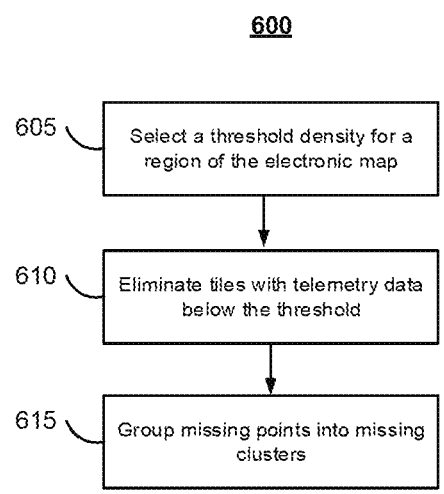
FIG. 6 shows a process for identifying missing clusters, in an embodiment.

FIG. 6 shows a process 600 for identifying missing clusters. Process 600 may be an embodiment of step 330 of process 300, described in further detail with reference to FIG. 3.

At 605, the server computer 105 executing the mapping application 110 with missing feature detection instructions 115 selects a threshold density for a region of the electronic map. The threshold density may be dependent on the telemetry probe density of a region as determined by the density map generated at 325. The threshold density for a map tile may be proportional to an average telemetry probe density calculated across several adjacent map tiles. The threshold density may be proportional to the total number of telemetry probes in the aggregated telemetry probes within the region. For example, the threshold may require map tiles to have more than 5 telemetry probes unassociated with existing map features in order to be identified as having missing clusters. In regions with large numbers of telemetry data, the threshold may be higher than regions with fewer telemetry probes. For example, in regions with high density of telemetry probes, the threshold may be 15 telemetry probes per map tile.

At 610, the server computer 105 executing the mapping application 110 with missing feature detection instructions 115 eliminates tiles with telemetry data below the threshold. The tiles below the threshold are thus removed from collection of tiles previously used to generate the density map at 520, and the telemetry data within the removed tiles is not used when determining missing clusters. Eliminated tiles may continue to be stored in the aggregated collection of tiles over the previous time interval in database 120. Subsequent additions of telemetry data and map tiles to the aggregated collection of tiles may eventually increase the density of telemetry probes above the threshold at 605, such that the eliminated tiles may later be used to determine missing clusters.

At 615, the server computer 105 executing the mapping application 110 with missing feature detection instructions 115 groups missing points into missing clusters. Missing points are individual telemetry probes that correspond to missing map features. Missing clusters are groupings of missing points, such that there is a high density of missing points within the missing cluster. The centroid of a high density region of missing points within a map tile may be calculated, and used to define a missing cluster. The missing cluster may be a line, a polygon, or any other geometric form with an area and a perimeter. The geometries of missing clusters defined at 615 are calculated at 335, and then used at 340 to define missing map features.

FIG. 7A is a graphic representation of an existing street map. The existing electronic map 700 may be stored in database 120 as electronic map data 130, and updated with missing map features using process 300 as described above with reference to FIG. 3-6. In this example, the existing electronic map 700 corresponds to a single map tile. The existing electronic map 700 contains an existing street 705, which may be defined by perimeter and the footprint area it occupies in the existing electronic map 700. Existing electronic map 700 also contains existing map features 707*a*, 707*b*, 707*c* and 707*d*, which are all buildings within the electronic map 700. The existing map features 707*a*-*d* each have a corresponding perimeter and a footprint area within the existing electronic map 700. The existing map features 707*a*-*d* correspond to buildings that impede passage of a user through the existing electronic map 700, while the existing street 705 provides an explicit path through which the existing map 700 can be traversed by a user. Both the existing street 705 and the existing map features 707*a*-*d* are stored within the existing electronic map 700 in database 120 as electronic map data 130. Existing map features 707*a*-*d* and existing street 705 may be stored within a spatial data structure linking them to their corresponding map tiles within the existing electronic map 700.

FIG. 7B is a graphic representation 710 of telemetry data overlaid on an existing street map. The overlaid telemetry data, which includes telemetry data points 715*a*, 715*b*, 715*c*, and 715*d*, illustrates the result of the server computer 105 performing steps 305 to 310 of process 300. As shown in FIG. 7B, the telemetry data point 715*b* corresponds to movement of users and mobile computing devices on the existing street 705. The points shown in telemetry data 715*c* do not correspond to an existing map feature, while telemetry data 715*d* is within the footprint of existing map feature 707*b*. The telemetry data points may be the result of aggregating telemetry probes received over a new time interval with telemetry probes received over one or more prior time intervals, as described with respect to FIG. 5.

FIG. 7C is a graphic representation 720 of identifying telemetry probes corresponding to existing map features. Representation 720 illustrates the result of the server computer 105 performing steps 305 to 315 of process 300. As shown in FIG. 7C, the existing streets are given a buffered area, which is a distance added to the perimeter of the existing streets 705 to form buffered streets 725*a* and 725*b*. The buffered area now encompasses the telemetry data points already within the existing street 705, but also telemetry data points such as point 715*a* that are outside the perimeter of the existing street 705 but within the buffered streets 725*a* and 725*b*. Telemetry data 715*c* continues to be outside of the region of the existing map features after adding the buffer to the existing streets 705. Thus the telemetry data 715*a* and all of the telemetry probes within the buffered street 725*a* and 725*b* are associated with existing map features, while telemetry data 715*c* is determined to be not associated with existing map features.

FIG. 7D is a graphic representation 730 of an identified missing cluster. Representation 730 illustrates the result of server computer 105 performing steps 305 to 330 of process 300. The telemetry probes that corresponded to the existing streets 705 (i.e., within buffered streets 725*a* and 725*b* in FIG. 7C) have been removed from the aggregated set of telemetry probes. A density map is generated using the remaining telemetry data 715*c*. The density of the telemetry data 715*c* is above a threshold, resulting in the identification of missing cluster 735. The missing cluster 735, as shown in FIG. 7D, does not correspond to any of the existing map features of the existing electronic map as shown in FIG. 7A. Following process 300 as described above with reference to FIG. 3-6, the missing cluster 735 may be given a geometry and incorporated into the existing electronic map.

Figure 7E:
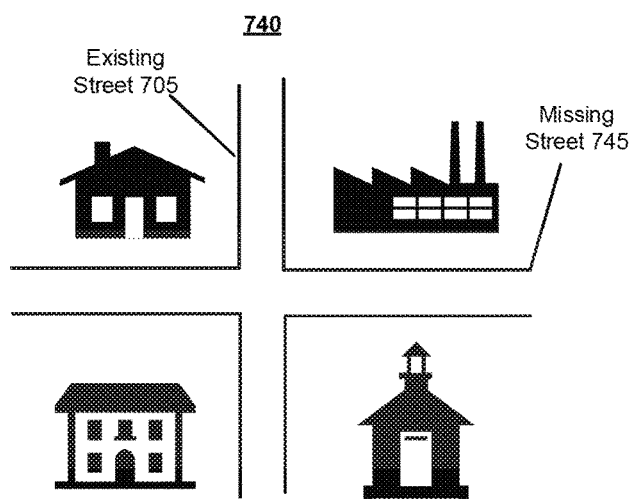
FIG. 7E is a graphic representation of an existing street map updated with a missing street, in an embodiment.

FIG. 7E is a graphic representation 740 of an existing street map updated with a missing street. Representation 740 illustrates the result of server computer 105 performing steps 305 to 340 of process 300. In particular, the missing cluster 735 shown in FIG. 7D has been assigned a rectangular geometry, and incorporated into the existing electronic map as missing street 745 in the map tile 700 shown in FIG. 7A. The updated electronic map now reflects the missing street 745.

As shown in FIG. 7A-7E, the process 300 is able to identify an entirely missing map feature based on the aggregation and analysis of received telemetry probes. The missing street 745 is identified based on collective user behavior and movement through the existing electronic map 700 as indicated by telemetry probes collected from mobile computing devices. Missing street 745 may thus be identified without using on-the-ground infrastructure, and the existing electronic map 700 can be updated and maintained using real-time or near-real-time user behavior, i.e., the received telemetry data 715.

Figure 8A:
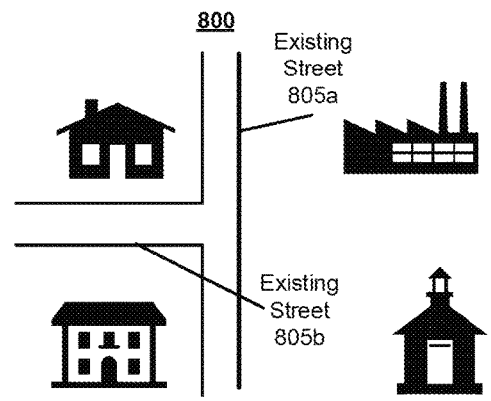
FIG. 8A is a graphic representation of an existing street map, in an embodiment.

FIG. 8A is a graphic representation 800 of an existing street map. The existing map 800 is stored in the database 120 as electronic map data 130. In this example, the existing map 800 represents a single map tile. The existing map 800 includes an existing street 805a and an intersecting existing street 805b. Existing streets 805a and 805b may be defined within the existing map 800 by their perimeter and the footprint area they respectively occupy within the existing map 800. The existing streets 805a and 805b may be stored within a spatial data structure together with the respective map tiles in which they are located.

Figure 8B:
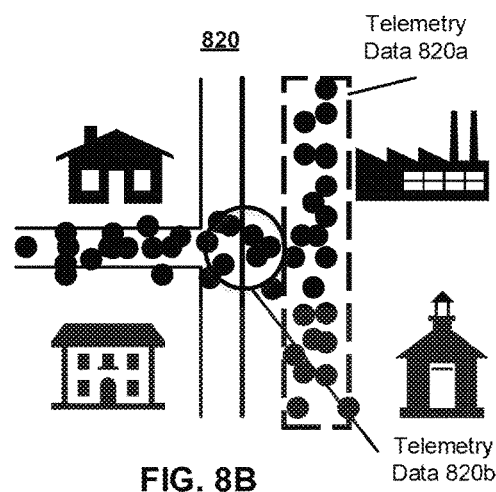
FIG. 8B is a graphic representation of identifying telemetry probes corresponding to existing map features, in an embodiment.

FIG. 8B is a graphic representation 820 of identifying telemetry probes corresponding to existing map features. The representation 820 as shown in FIG. 8B illustrates the result of server computer 105 performing process 300 from 305 to 315. The telemetry data 820a and 820b may reflect the aggregation of new telemetry probes with telemetry probes collected over a previous time interval to form an aggregated set of telemetry probes. The location of the telemetry probes within the aggregated set of telemetry probes have been compared to the existing map features, such as existing streets 805a and 805b, to identify the telemetry probes that correspond to existing map features. As shown in FIG. 8B, the telemetry data 820a and a portion of the telemetry data 820b are not associated with existing map features. These probes may then be used to generate a density map at 325, identify missing clusters at 330, determine a geometry of missing clusters 335 and define a missing map feature at 340, as described above with reference to FIG. 3.

Figure 8C:
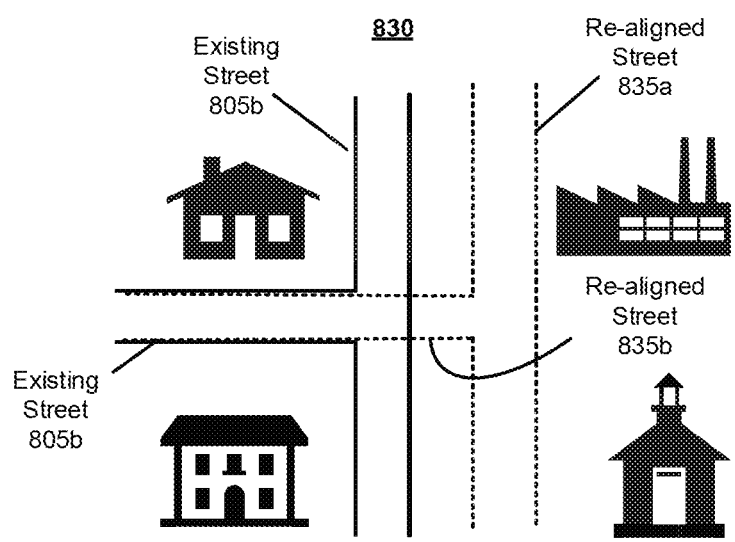
FIG. 8C is a graphic representation of an existing street map updated with a re-aligned street, in an embodiment.

FIG. 8C is a graphic representation 830 of an existing street map updated with a re-aligned street. The representation 830 shown in FIG. 8C illustrates the result of server computer 105 performing process 300 from 305 to 340. After missing clusters corresponding to the telemetry data 820a and 820b were identified, as shown in FIG. 8B, and rectangular geometries were assigned to the missing clusters to form re-aligned streets 835a and 835b. In particular, at 340, prior to incorporating the identified missing cluster into the existing electronic map 800, process 300 identified re-aligned street 835a as a re-alignment of a misaligned existing street 805b. Following the identification of re-aligned streets 835a and 835b, rather than simply adding the missing feature of the re-aligned streets 835a and 835b, the existing electronic map 800 will be updated by eliminating the misaligned existing street 805b and replacing it in the electronic map 800 with the realigned street 835a and 835b.

As described herein, telemetry probe data collected from mobile computing devices provides a source of information for updating an electronic map with missing map features. Using the telemetry probe data, movements of users that are not associated with existing map features are identified. These unassociated telemetry probes are then used to determine the position and shape of the missing feature within the existing electronic map. The existing electronic map can then be updated to include the missing map feature.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of identifying missing map features in an electronic map, the method comprising:
   receiving, from each of a plurality of mobile computing devices, a plurality of telemetry probes, each telemetry probe comprising a geographic location of the mobile computing device at a time of the probe;
   aggregating the received pluralities of telemetry probes to obtain a set of aggregated telemetry probes;
   identifying a subset of telemetry probes in the set of aggregated telemetry probes,
      wherein each telemetry probe in the subset of telemetry probes corresponds to an existing map feature, and wherein identifying a telemetry probe for inclusion in the subset of telemetry probes comprises:
         determining whether the geographic location of the telemetry probe is within a threshold distance of a geographic location of an existing map feature; and
         responsive to determining the geographic location of the telemetry probe is within the threshold distance of the geographic location of the existing map feature, including the identified telemetry probe in the subset of telemetry probes;
   removing the identified subset of telemetry probes from the set of aggregated telemetry probes to obtain a set of remaining telemetry probes that do not correspond to existing map features;
   generating a density map of the set of remaining telemetry probes;
   identifying a missing cluster in the density map, the missing cluster comprising a subset of the remaining telemetry probes having at least a threshold density in the density map;
   determining a geometry formed by the identified missing cluster; and
   defining a missing map feature using the determined geometry.

2. The method of claim 1, wherein determining whether the geographic location of the telemetry probe is within the threshold distance of the geographic location of an existing map feature, further comprises:
   forming a buffer region around an existing map feature by adding a distance to a perimeter of the existing map feature; and
   including telemetry probes within the buffer region in the identified subset of telemetry probes.

3. The method of claim 1, wherein the pluralities of telemetry probes are obtained over a first time interval.

4. The method of claim 1, wherein generating a density map of the set of remaining telemetry probes comprises:

aggregating a set of remaining telemetry probes collected during a first time interval with a stored set of remaining telemetry probes collected during a second time interval; and generating the density map based on the aggregation of remaining telemetry probes during the first time interval and the second time interval.

5. The method of claim 1, further comprising:
selecting a threshold density for a region of the density map based at least in part on a number of telemetry probes in the region.

6. The method of claim 1, wherein the determined geometries formed by missing clusters comprise at least a line.

7. The method of claim 1, wherein the determined geometries formed by missing clusters comprise at least a polygon.

8. The method of claim 1, further comprising:
retrieving data describing map tiles; and
for each telemetry probe in the set of aggregated telemetry probes:
identifying a map tile to which a telemetry probe corresponds based on a geographic location of the telemetry probe and the data describing map tiles; and
storing the telemetry probe in a subset of telemetry probes associated with the identified map tile.

9. The method of claim 1, further comprising:
determining that the geometry formed by the identified missing cluster is an existing map feature misaligned in the electronic map; and
in response to the determining, adjusting a location of the existing map feature in the electronic map based on the geometry formed by the missing cluster.

10. The method of claim 1, further comprising:
determining that the geometry formed by the identified missing cluster is located in a body of water in the electronic map; and
in response to the determining, adding a waterway route to the electronic map based on the geometry formed by the identified missing cluster.

11. The method of claim 1, further comprising:
automatically updating the electronic map with missing map features.

12. A non-transitory computer-readable storage containing computer program code executable on a processor for identifying missing map features in an electronic map, the computer program code for:
receiving, from each of a plurality of mobile computing devices, a plurality of telemetry probes, each telemetry probe comprising a geographic location of the mobile computing device at a time of the probe;
aggregating the received pluralities of telemetry probes to obtain a set of aggregated telemetry probes;
identifying a subset of telemetry probes in the set of aggregated telemetry probes,
wherein each telemetry probe in the subset of telemetry probes corresponds to an existing map feature, and wherein identifying a telemetry probe for inclusion in the subset of telemetry probes comprises:
determining whether the geographic location of the telemetry probe is within a threshold distance of a geographic location of an existing map feature; and
responsive to determining the geographic location of the telemetry probe is within the threshold distance of the geographic location of the existing map feature, including the identified telemetry probe in the subset of telemetry probes;
removing the identified subset of telemetry probes from the set of aggregated telemetry probes to obtain a set of remaining telemetry probes that do not correspond to existing map features;
generating a density map of the set of remaining telemetry probes;
identifying a missing cluster in the density map, the missing cluster comprising a subset of the remaining telemetry probes having at least a threshold density in the density map;
determining a geometry formed by the identified missing cluster; and
defining a missing map feature using the determined geometry.

13. The computer-readable medium of claim 12, wherein determining whether the geographic location of the telemetry probe is within the threshold distance of the geographic location of an existing map feature, further comprises:
forming a buffer region around an existing map feature by adding a distance to a perimeter of the existing map feature; and
including telemetry probes within the buffer region in the identified subset of telemetry probes.

14. The computer-readable medium of claim 12, wherein the pluralities of telemetry probes are obtained over a first time interval.

15. The computer-readable medium of claim 12, wherein generating a density map of the set of remaining telemetry probes comprises:
aggregating a set of remaining telemetry probes collected during a first time interval with a stored set of remaining telemetry probes collected during a second time interval; and
generating the density map based on the aggregation of remaining telemetry probes during the first time interval and the second time interval.

16. The computer-readable medium of claim 12, further comprising:
selecting a threshold density for a region of the density map based at least in part on a number of telemetry probes in the region.

17. The computer-readable medium of claim 12, wherein the determined geometries formed by missing clusters comprise at least a line.

18. The computer-readable medium of claim 12, wherein the determined geometries formed by missing clusters comprise at least a polygon.

19. The computer-readable medium of claim 12, further comprising:
retrieving data describing map tiles; and
for each telemetry probe in the set of aggregated telemetry probes:
identifying a map tile to which a telemetry probe corresponds based on a geographic location of the telemetry probe and the data describing map tiles; and
storing the telemetry probe in a subset of telemetry probes associated with the identified map tile.

20. The computer-readable medium of claim 12, further comprising:
determining that the geometry formed by the identified missing cluster is an existing map feature misaligned in the electronic map; and in response to the determining, adjusting a location of the existing map feature in the electronic map based on the geometry formed by the missing cluster.

21. The computer-readable medium of claim 12, further comprising:

determining that the geometry formed by the identified missing cluster is located in a body of water in the electronic map; and in response to the determining, adding a waterway route to the electronic map based on the geometry formed by the identified missing cluster.

22. The computer-readable medium of claim 12, further comprising:

automatically updating the electronic map with missing map features.

* * * * *